(12) United States Patent
Goto (10) Patent No.: US 12,473,908 B2
(45) Date of Patent: Nov. 18, 2025

(54) DECOMPRESSION SYSTEM, CONTROL DEVICE, AND CONTROL METHOD

(71) Applicant: KABUSHIKI KAISHA YASKAWA DENKI, Fukuoka (JP)

(72) Inventor: Akinori Goto, Fukuoka (JP)

(73) Assignee: KABUSHIKI KAISHA YASKAWA DENKI, Fukuoka (JP)

( * ) Notice: Subject to any disclaimer, the term of this patent is extended or adjusted under 35 U.S.C. 154(b) by 143 days.

(21) Appl. No.: 18/551,342

(22) PCT Filed: Dec. 20, 2021

(86) PCT No.: PCT/JP2021/047051
§ 371 (c)(1),
(2) Date: Sep. 19, 2023

(87) PCT Pub. No.: WO2022/201685
PCT Pub. Date: Sep. 29, 2022

(65) Prior Publication Data
US 2024/0175441 A1    May 30, 2024

(30) Foreign Application Priority Data
Mar. 24, 2021  (JP) ................ 2021-050428

(51) Int. Cl.
*F04B 49/20*    (2006.01)
*F04B 35/04*    (2006.01)
(Continued)

(52) U.S. Cl.
CPC ............ *F04B 49/20* (2013.01); *F04B 35/04* (2013.01); *F04B 37/14* (2013.01); *F04B 49/06* (2013.01);
(Continued)

(58) Field of Classification Search
CPC .......... F04B 35/04; F04B 37/14; F04B 49/06; F04B 49/065; F04B 49/20; F04B 49/10;
(Continued)

(56) References Cited

U.S. PATENT DOCUMENTS 6,822,417 B2 * 11/2004 Kawaji ................ H02P 25/092
                                                                318/434
7,579,800 B2 *  8/2009 Kitano .................... F04B 35/04
                                                                318/434
(Continued)

FOREIGN PATENT DOCUMENTS

JP   H03-85393 A    4/1991
JP   2000-18169 A   1/2000
(Continued)

*Primary Examiner* — Charles G Freay
(74) *Attorney, Agent, or Firm* — Osha Bergman Watanabe & Burton LLP (57) ABSTRACT

A decompression system includes: an electric pump configured to decompress a primary-side space with respect to a secondary-side space; and a control device configured to control a motor of the electric pump, wherein the control device includes: a torque command generation unit configured to generate a torque command to operate the motor in accordance with an operation command; a limiter configured to limit the torque command to a limit value or less; a power conversion circuit configured to generate driving power corresponding to the torque command passed through the limiter and supply the driving power to the motor; and a limit changing unit configured to temporarily increase the limit value in response to opening of the decompressed primary-side space with respect to the secondary-side space.

12 Claims, 5 Drawing Sheets

(51) Int. Cl.
  *F04B 37/14*   (2006.01)
  *F04B 49/06*   (2006.01)
  *H02P 6/08*    (2016.01)
  *H02P 7/06*    (2006.01)
  F04B 49/10     (2006.01)
  F04C 25/02     (2006.01)
  F04D 25/06     (2006.01)
  F04D 27/00     (2006.01)

(52) U.S. Cl.
  CPC ................. *H02P 6/08* (2013.01); *H02P 7/06* (2013.01); *F04B 49/065* (2013.01); *F04B 49/10* (2013.01); *F04B 2203/0207* (2013.01); *F04C 25/02* (2013.01); *F04D 25/06* (2013.01); *F04D 27/004* (2013.01)

(58) Field of Classification Search
  CPC .... H02P 6/08; H02P 7/06; F04C 25/02; F04D 25/06
  See application file for complete search history.

(56) References Cited

U.S. PATENT DOCUMENTS

| | | | | |
|---|---|---|---|---|
| 10,683,867 B2 * | 6/2020 | Nakamura | ........ | H01L 21/67017 |
| 2003/0219342 A1 * | 11/2003 | Curry | ..................... | F04D 19/04 |
| | | | | 417/44.1 |

FOREIGN PATENT DOCUMENTS

| JP | 2010-96130 A | 4/2010 |
|---|---|---|
| WO | 2011/052675 A1 | 5/2011 |

* cited by examiner

DECOMPRESSION SYSTEM, CONTROL DEVICE, AND CONTROL METHOD

TECHNICAL FIELD

The present disclosure relates to a decompression system, a control device, and a control method.

BACKGROUND ART

Patent Document 1 discloses a motor control device for a vacuum pump including a load detection means for detecting a load of a motor based on a pressure in a vacuum pump, a rotational speed of a rotor, or an axial directional force of the rotor, and a control means for controlling a voltage applied to the motor during steady rotation in response to a detection output of the load detection means to suppress fluctuation in the rotational speed of the rotor with respect to load fluctuation.

CITATION LIST

Patent Literature

Patent Document 1: JP H03-85393 A

SUMMARY OF INVENTION

Technical Problem

The present disclosure provides a decompression system that is effective in improving efficiency of a process performed by decompressing a primary-side space with respect to a secondary-side space.

Solution to Problem

A decompression system according to an aspect of the present disclosure includes: an electric pump configured to decompress a primary-side space with respect to a secondary-side space; and a control device configured to control a motor of the electric pump, wherein the control device includes: a torque command generation unit configured to generate a torque command to operate the motor in accordance with an operation command; a limiter configured to limit the torque command to a limit value or less; a power conversion unit configured to generate driving power corresponding to the torque command passed through the limiter and supply the driving power to the motor; and a limit changing unit configured to temporarily increase the limit value in response to opening of the decompressed primary-side space with respect to the secondary-side space.

A control device according to another aspect of the present disclosure includes: a torque command generation unit configured to generate a torque command to operate, in accordance with an operation command, a motor of an electric pump configured to decompress a primary-side space with respect to a secondary-side space; a limiter configured to limit the torque command to a limit value or less; a power conversion unit configured to generate driving power corresponding to the torque command passed through the limiter and supply the driving power to the motor; and a limit changing unit configured to temporarily increase the limit value in response to opening of the decompressed primary-side space with respect to the secondary-side space.

A control method according to still another aspect of the present disclosure includes: generating a torque command to operate, in accordance with an operation command, a motor of an electric pump configured to decompress a primary-side space with respect to a secondary-side space; limiting the torque command to a limit value or less; generating driving power corresponding to the torque command limited to the limit value or less and supplying the driving power to the motor; and temporarily increasing the limit value in response to opening of the decompressed primary-side space with respect to the secondary-side space.

Advantageous Effects of Invention

According to the present disclosure, it is possible to provide a decompression system that is effective in improving efficiency of a process performed by decompressing a primary-side space with respect to a secondary-side space.

DESCRIPTION OF EMBODIMENTS

Hereinafter, an embodiment will be described in detail with reference to the drawings. In the description, elements that are the same or have the same function are given the same reference signs, and redundant descriptions thereof are omitted.

Processing System

Figure 1:
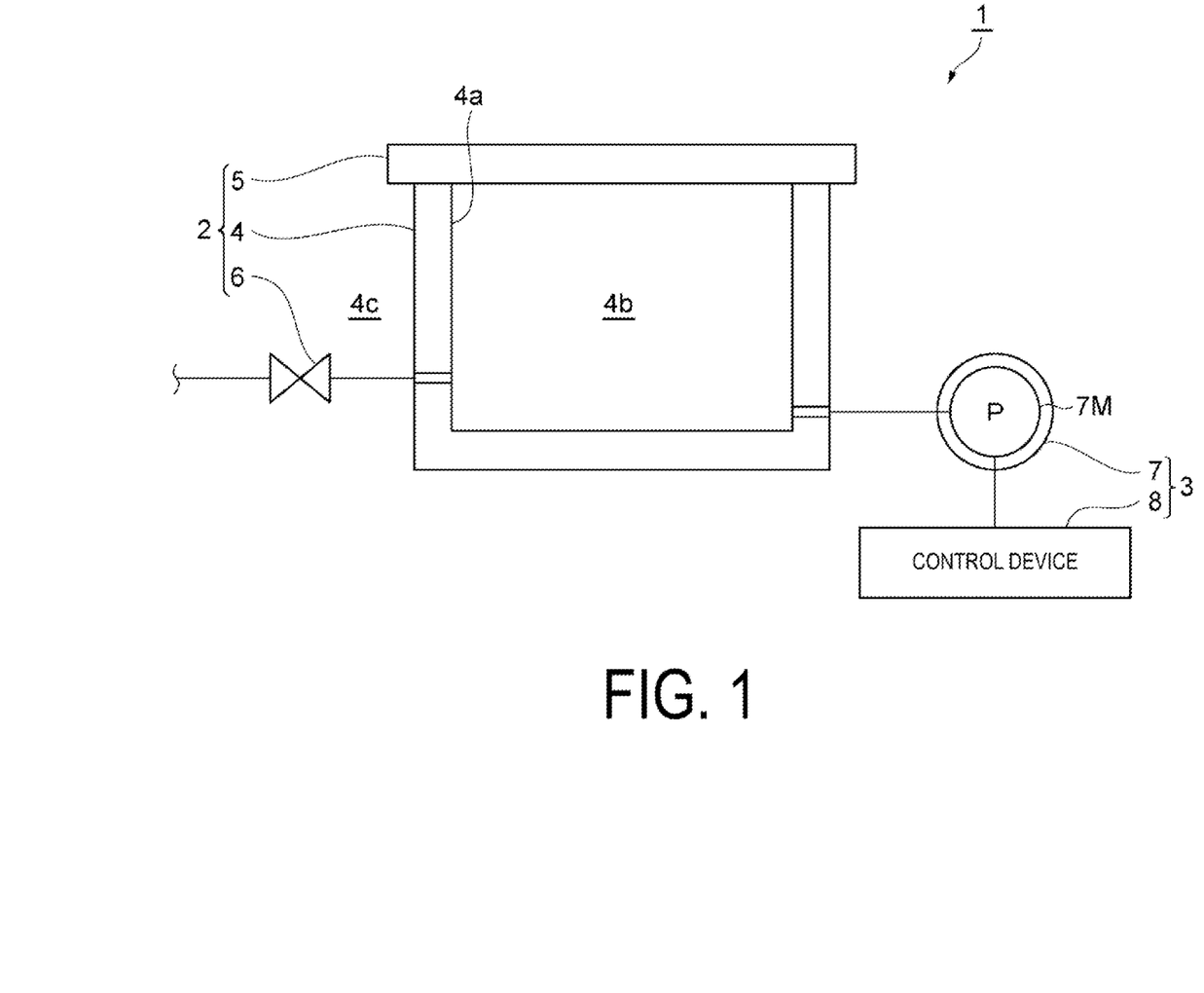
FIG. 1 is a schematic view illustrating a configuration of a processing system.

A processing system 1 illustrated in FIG. 1 is a device that performs processing in a primary-side space in a state where the primary-side space is decompressed with respect to a secondary-side space by a pump. A content of the process performed in the primary-side space is not particularly limited, and specific examples thereof include a film forming process, an etching process, and the like in the manufacture of a semiconductor.

As illustrated in FIG. 1, the processing system 1 includes a vacuum device 2 and a decompression system 3. The vacuum device 2 includes a chamber 4, an opening/closing member 5, and a valve 6. The chamber 4 accommodates a processing object such as a semiconductor wafer. An opening 4*a* is formed in an upper portion of the chamber 4 for carrying in and out the processing object. The opening 4*a* may be formed in a side portion of the chamber 4.

The opening/closing member 5 isolates an internal space 4*b* of the chamber 4 from an external space 4*c* of the chamber 4 by closing the opening 4*a*. As an example, the opening/closing member 5 opens and closes the opening 4*a* in accordance with carrying-in and carrying-out of the processing object with respect to the chamber 4, and maintains the opening 4*a* in a closed state during a period in which the processing object in the chamber 4 is processed. The valve 6 opens and closes a flow path that allows the internal space of the chamber 4 to communicate with the external space of the chamber 4.

The decompression system 3 decompresses the internal space 4*b* with respect to the external space 4*c* of the chamber 4 in a state where the valve 6 is in the "closed" state and the opening/closing member 5 closes the opening 4a. The decompression system 3 includes an electric pump 7 and a control device 8.

The electric pump 7 has a motor 7M, and decompresses the primary-side space with respect to the secondary-side space by power generated by the motor 7M in response to supply of power. For example, the electric pump 7 is a gas transport vacuum pump, and decompresses the primary-side space by transferring gas in the primary-side space to the secondary-side space. The gas transport system by the electric pump 7 may be a positive displacement system or a momentum transport system.

The primary side means an upstream side in a direction in which the electric pump 7 transports the gas, and the secondary side means a downstream side in the direction in which the electric pump 7 transports the gas. The primary-side space means a space communicating with the primary side of the electric pump 7, and the secondary-side space means a space communicating with the secondary side of the electric pump 7. The primary side of the electric pump 7 communicates with the internal space 4b of the chamber 4, and the secondary side of the electric pump 7 communicates with the external space 4c. Therefore, in the decompression system 3, the internal space 4b of the chamber 4 corresponds to the primary-side space, and the external space 4c of the chamber 4 corresponds to the secondary-side space.

When the valve 6 is in the "closed" state and the opening/closing member 5 closes the opening 4a, the primary-side space is closed with respect to the secondary-side space. Here, the closed state means a state where a leakage flow path that does not pass through the electric pump 7 is not formed between the secondary-side space and the primary-side space. The state where the leakage flow path is not formed includes a state where a minute leakage flow path having a flow path resistance larger than a flow path resistance of a decompression flow path passing through the electric pump 7 is formed.

At least when the valve 6 is in the "open" state or when the opening/closing member 5 opens the opening 4a, the primary-side space is open with respect to the secondary-side space. Here, open means a state where the leakage flow path is formed between the secondary-side space and a primary-side space. The external space 4c of the chamber 4, which is the secondary-side space, may be open to the atmosphere. In this case, at least when the valve 6 is in the "open" state or the opening/closing member 5 opens the opening 4a, the primary-side space is open to the atmosphere.

Figure 2:
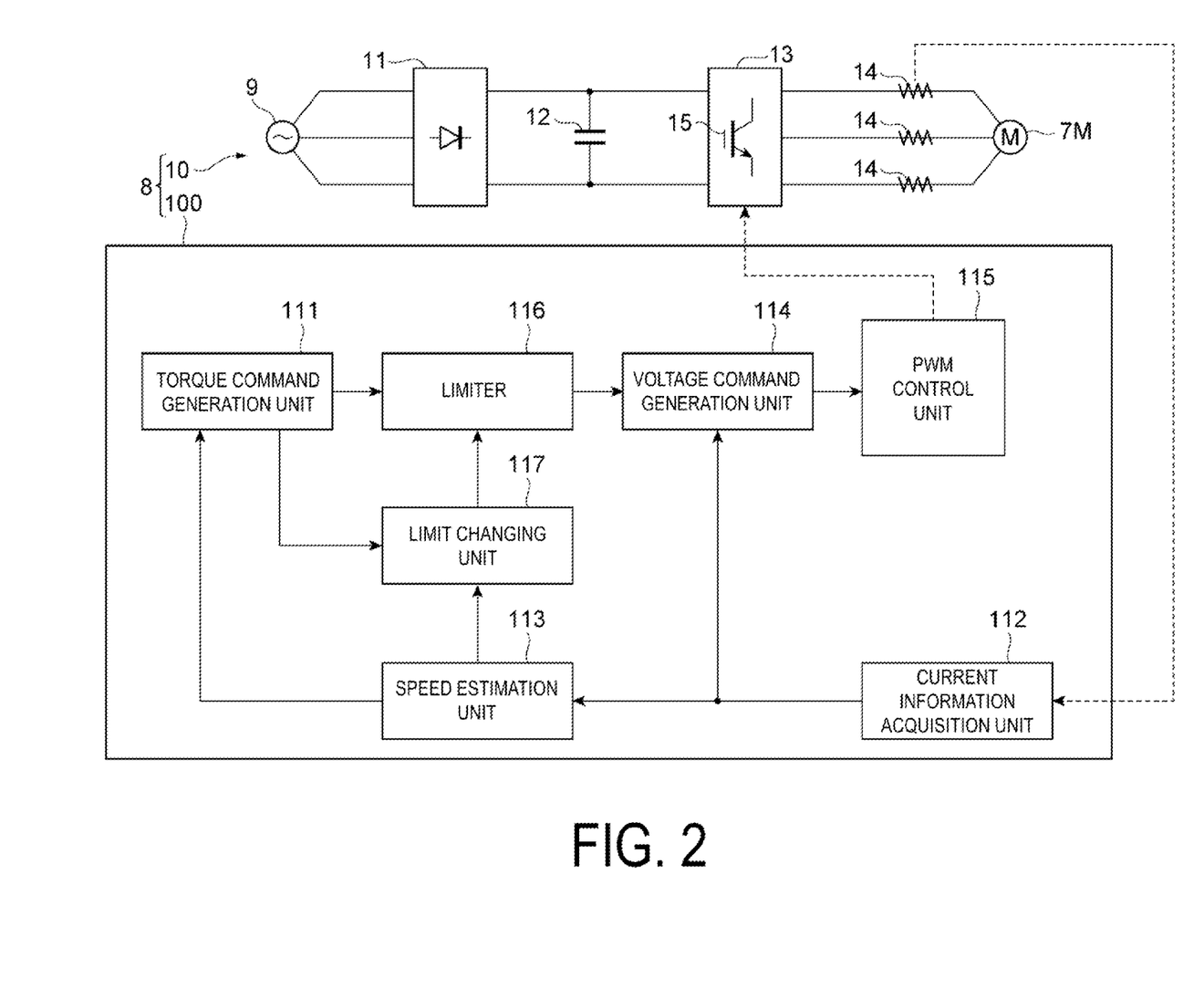
FIG. 2 is a schematic view illustrating a configuration of a control device.

The control device 8 controls the motor 7M of the electric pump 7. For example, as illustrated in FIG. 2, the control device 8 includes a power conversion circuit 10 and a control circuit 100. The power conversion circuit 10 (power conversion unit) converts power supplied from a power supply 9 (hereinafter, referred to as "source power") into driving power and supplies the driving power to the motor 7M. As an example, the power conversion circuit 10 includes a rectifier circuit 11, a smoothing capacitor 12, an inverter circuit 13, and a current sensor 14. The rectifier circuit 11 is, for example, a diode bridge circuit, and converts the source power into direct current power. The smoothing capacitor 12 smooths the direct current power described above.

The inverter circuit 13 performs power conversion between the direct current power described above and the driving power described above. For example, the inverter circuit 13 converts direct current power into driving power and supplies the driving power to the motor 7M in a powering state, and converts power generated by the motor 7M into direct current power in a regeneration state. The powering state is a state where the motor 7M is operated by the driving power supplied from the inverter circuit 13, and the regeneration state is a state where the motor 7M supplies the generated power corresponding to the operation to the inverter circuit 13.

For example, the inverter circuit 13 includes a plurality of switching elements 15, and performs the power conversion described above by switching the plurality of switching elements 15 on and off. Each of the switching elements 15 is, for example, a power metal oxide semiconductor field effect transistor (MOSFET) or an insulated gate bipolar transistor (IGBT), and is switched on and off in accordance with a gate drive signal.

The current sensor 14 detects a current flowing between the inverter circuit 13 and the motor 7M (hereinafter, referred to as "output current"). For example, the current sensor 14 may be configured to detect the currents of all phases of the three-phase alternating current (U-phase, V-phase, and W-phase), or may be configured to detect the currents of any two phases of the three-phase alternating current. As long as no zero-phase current is generated, the sum of the currents of the U-phase, the V-phase, and the W-phase is zero, and information about the currents of all the phases is obtained, even when the currents of two phases are detected.

The configuration of the power conversion circuit 10 described above is merely an example. The configuration of the power conversion circuit 10 can be changed in any way as long as the power conversion circuit 10 can generate the driving power of the motor 7M. For example, the rectifier circuit 11 may be a PWM converter circuit that converts alternating current power to direct current power or a matrix converter circuit. The power conversion circuit 10 may be a matrix converter circuit that performs bidirectional power conversion between the source power and the driving power without direct current conversion. In a case in which the source power is direct current power, the power conversion circuit 10 need not include the rectifier circuit 11.

The control circuit 100 controls the power conversion circuit 10 to generate driving power for operating the motor 7M in accordance with an operation command. For example, the control circuit 100 is configured to generate a torque command to operate the electric pump 7 in accordance with the operation command, and to control the power conversion circuit 10 to generate driving power corresponding to the torque command and supply the driving power to the electric pump 7.

When the primary-side space is closed with respect to the secondary-side space, the primary-side space is decompressed with respect to the secondary-side space by the motor 7M operating in accordance with the operation command. After the primary-side space is opened and closed with respect to the secondary-side space, the control circuit 100 continues the operation of the motor 7M even in a period during which the primary-side space is open with respect to the secondary-side space in order to quickly perform re-decompression of the primary-side space with respect to the secondary-side space. When the primary-side space is open with respect to the secondary-side space, the motor 7M operates to transport the gas from the primary-side space to the secondary-side space through the decompression flow path, and return the gas from the secondary-side space to the primary-side space through the leakage flow path.

When the primary-side space is open with respect to the secondary-side space in a state where the primary-side space is decompressed with respect to the secondary-side space, the torque required for the electric pump 7 to continue the operation in accordance with the operation command may become excessive. On the other hand, the control circuit 100 further limits the torque command to the limit value or less, and controls the power conversion circuit 10 to generate the driving power corresponding to the torque command limited to the limit value or less and supply the driving power to the motor 7M. By limiting the torque command to the limit value or less, the torque command is prevented from becoming excessive, but the operation of the electric pump 7 deviates from the operation command.

When the opening of the primary-side space with respect to the secondary-side space is canceled and the decompression of the primary-side space is started again, the required torque command gradually decreases, and the operation of the motor 7M in accordance with the operation command is gradually recovered. However, since it takes time to recover the operation of the motor 7M in accordance with the operation command, the process performed by decompressing the primary-side space with respect to the secondary-side space decreases. On the other hand, the control circuit 100 further temporarily increases the limit value in response to the opening of the decompressed primary-side space with respect to the secondary-side space. As a result, the deviation of the operation of the motor 7M from the operation command is suppressed. Therefore, this is effective in improving the efficiency of the process performed by decompressing the primary-side space with respect to the secondary-side space.

For example, the control circuit 100 includes, as functional components, a torque command generation unit 111, a limiter 116, a current information acquisition unit 112, a voltage command generation unit 114, a speed estimation unit 113, a PWM control unit 115, and a limit changing unit 117, and repeats a control cycle by these components in a predetermined control cycle.

The torque command generation unit 111 generates a torque command to operate the motor 7M in accordance with the operation command in each control cycle. As an example, the operation command includes a target speed, and the torque command generation unit 111 generates the torque command such that the speed of the motor 7M follows the target speed. For example, the torque command generation unit 111 generates a torque command by performing a proportional operation, a proportional-integral operation, a proportional-integral-differential operation, or the like on the deviation between the target speed and the speed of the motor 7M.

The limiter 116 limits the torque command generated by the torque command generation unit 111 to the limit value or less in each control cycle. For example, when the torque command exceeds the limit value, the limiter 116 changes the value of the torque command to the limit value.

When the motor 7M that has been stopped is activated to start decompression in the primary-side space with respect to the secondary-side space, the torque command generation unit 111 may gradually increase the speed of the motor 7M to the target speed at an accelerating rate at which the torque command is maintained to be less than the limit value. For example, the torque command generation unit 111 calculates a speed command value in the current control cycle based on a speed pattern in which the speed gradually increases to the target speed at the above accelerating rate and the number of control cycles executed after the activation of the motor 7M, and generates a torque command such that the speed of the motor 7M follows the speed command value.

The current information acquisition unit 112 acquires a detection value of the output current from the current sensor 14 in each control cycle. In each control cycle, the voltage command generation unit 114 generates a voltage command for causing the motor 7M to generate a torque following the torque command passed through the limiter 116. For example, the voltage command generation unit 114 calculates a current command corresponding to the torque command, and generates the voltage command such that the output current follows the current command.

The speed estimation unit 113 estimates the speed of the motor 7M based on the voltage command and the output current in each control cycle. Specific examples of a method for estimating the speed of the motor 7M include a method using an extended induced voltage observer.

The estimation result of the speed by the speed estimation unit 113 is used for the generation of the torque command by the torque command generation unit 111 described above. The estimation of the speed by the speed estimation unit 113 and the generation of the torque command using the estimation result may be performed in the same control cycle. In this case, the speed estimation unit 113 estimates the speed of the motor 7M prior to the generation of the torque command by the torque command generation unit 111 based on the voltage command generated in an immediately preceding control cycle and the output current.

The generation of the torque command using the estimation result of the speed by the speed estimation unit 113 may be performed in the next control cycle of the control cycle in which the speed estimation is performed by the speed estimation unit 113. In this case, after the voltage command is generated by the voltage command generation unit 114, the speed estimation unit 113 estimates the speed of the motor 7M using the generation result.

The electric pump 7 may include a speed sensor that detects the speed of the motor 7M. In this case, the torque command generation unit 111 may generate the torque command using a detection value detected by the speed sensor, and the control circuit 100 may not include the speed estimation unit 113.

The PWM control unit 115 controls the power conversion circuit 10 to generate driving power corresponding to the torque command passed through the limiter 116 and supply the driving power to the motor 7M in each control cycle. For example, the PWM control unit 115 switches on and off the plurality of switching elements 15 of the inverter circuit 13 in each control cycle to apply a voltage corresponding to the voltage command generated by the voltage command generation unit 114 to the motor 7M.

The limit changing unit 117 temporarily increases the limit value in response to the opening of the decompressed primary-side space with respect to the secondary-side space. For example, the limit changing unit 117 temporarily changes the limit value from the normal limit value to an increase limit value larger than the normal limit value in response to the opening of the decompressed primary-side space with respect to the secondary-side space.

The limit changing unit 117 may change, after the primary-side space is opened with respect to the secondary-side space, the limit value from the normal limit value to the increase limit value after the speed of the motor 7M decreases until a predetermined speed decrease condition is satisfied. Specific examples of the speed decrease condition include a condition that the speed of the motor 7M decreases to a predetermined decrease determination speed.

The limit changing unit 117 may detect the opening of the primary-side space with respect to the secondary-side space based on the torque command. The limit changing unit 117 may detect the opening of the primary-side space with respect to the secondary-side space based on a comparison between the torque command generated by the torque command generation unit 111 and the limit value before being increased (normal limit value). For example, the limit changing unit 117 may detect the opening of the primary-side space with respect to the secondary-side space when the torque command generated by the torque command generation unit 111 exceeds the normal limit value.

In the electric pump 7, as a pressure difference between the secondary-side space and the primary-side space increases, the torque for operating the motor 7M at the target speed decreases. For this reason, a first torque is required to operate the motor 7M in accordance with the operation command in a state where the pressure difference between the secondary-side space and the primary-side space is at a first level, and a second torque larger than the first torque is required to operate the motor 7M in accordance with the operation command in a state where the pressure difference between the secondary-side space and the primary-side space is at a second level smaller than the first level. The limit changing unit 117 may change the limit value within a range from the first torque to the second torque. For example, the normal limit value may exceed the first torque and may be less than the second torque. The increase limit value may exceed the normal limit value and may be equal to or less than the second torque.

In a state where the primary-side space is decompressed to a substantially vacuum state, the pressure difference between the secondary-side space and the primary-side space reaches a maximum level. In a state where the secondary-side space is open with respect to the primary-side space, the pressure difference between the secondary-side space and the primary-side space reaches a minimum level (zero). The first level may be the maximum level, and the second level may be the minimum level. However, the first level and the second level are not particularly limited except that the second level is smaller than the first level.

The limit changing unit 117 may cancel the state in which the limit value is increased when the torque command decreases until a predetermined torque decrease condition is satisfied after the limit value is increased. For example, the limit changing unit 117 may change the limit value from the increase limit value to the normal limit value when the torque command decreases until the torque decrease condition is satisfied after the limit value is changed from the normal limit value to the increase limit value.

The torque decrease condition may include a condition that the torque command decreases to be less than the increased limit value (increase limit value). For example, the limit changing unit 117 may change the limit value from the increase limit value to the normal limit value when the torque command decreases to less than the increase limit value after changing the limit value from the normal limit value to the increase limit value.

The limit changing unit 117 may cancel the state in which the limit value is increased when the state in which the limit value is increased continues until a predetermined continuation condition is satisfied without the torque command decreasing until the torque decrease condition is satisfied. For example, after changing the limit value from the normal limit value to the increase limit value, the limit changing unit 117 may change the limit value from the increase limit value to the normal limit value when the state in which the limit value is increased continues until the continuation condition is satisfied, without the torque command decreasing until the torque decrease condition is satisfied.

The continuation condition may include a condition that the torque command accumulates to a predetermined accumulation level. For example, the limit changing unit 117 may change the limit value from the increase limit value to the normal limit value when the torque command is accumulated to the accumulation level without the torque command decreasing until the torque decrease condition is satisfied.

The continuation condition may include a condition that the state in which the limit value is increased continues for a predetermined period. For example, the limit changing unit 117 may change the limit value from the increase limit value to the normal limit value when the state in which the limit value is increased continues for a predetermined period without the torque command decreasing until the torque decrease condition is satisfied.

As an example, the limit changing unit 117 checks whether the torque command exceeds the normal limit value in each control cycle, and detects that the primary-side space is open with respect to the secondary-side space when the torque command exceeds the normal limit value in a predetermined number of consecutive control cycles.

Thereafter, the limit changing unit 117 checks whether the speed of the motor 7M satisfies the speed decrease condition in each control cycle, and changes the limit value from the normal limit value to the increase limit value when the speed of the motor 7M satisfies the speed decrease condition. When the limit value is changed from the normal limit value to the increase limit value, the limiter 116 limits the torque command value to be equal to or less than the increase limit value.

After changing the limit value from the normal limit value to the increase limit value, the limit changing unit 117 checks, in each control cycle, whether the torque command has decreased to satisfy the torque decrease condition and whether the state in which the limit value is increased has continued to satisfy the continuation condition, and changes the limit value from the increase limit value to the normal limit value when the torque command satisfies the torque decrease condition or when the state in which the limit value is increased continues until the continuation condition is satisfied. When the limit value is changed from the increase limit value to the normal limit value, the limiter 116 limits the torque command value to be equal to or less than the normal limit value.

Figure 3:
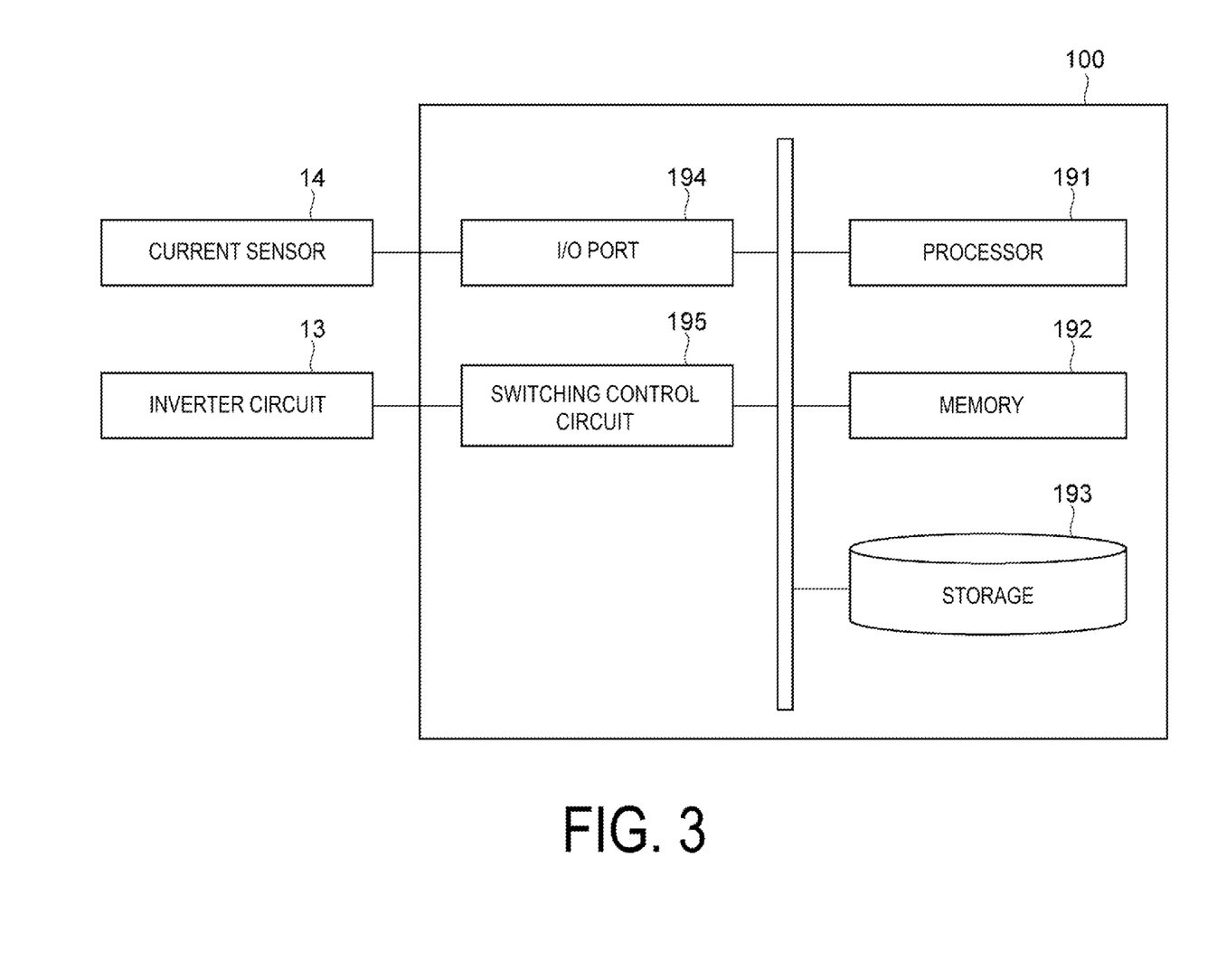
FIG. 3 is a block diagram illustrating an example of a hardware configuration of a control circuit.

FIG. 3 is a block diagram illustrating an example of a hardware configuration of the control circuit 100. As illustrated in FIG. 3, the control circuit 100 includes one or a plurality of processors 191, a memory 192, a storage 193, an I/O port 194, and a switching control circuit 195. The storage 193 includes a storage medium that can be read by a computer, such as a non-volatile semiconductor memory. The storage 193 stores a program that causes the control circuit 100 to: generate the torque command to operate, in accordance with an operation command, the motor 7M of the electric pump 7 configured to decompress the primary-side space with respect to the secondary-side space; limit the torque command to the limit value or less; generate driving power corresponding to the torque command limited to the limit value or less and supply the driving power to the motor 7M; and temporarily increase the limit value in response to opening of the decompressed primary-side space with respect to the secondary-side space.

The memory 192 temporarily stores the program loaded from the storage medium of the storage 193 and the calculation result from each of the plurality of processors 191. The processor 191 constructs each function block of the control circuit 100 by executing the above program in cooperation with the memory 192. The I/O port 194 inputs and outputs electric signals to and from the current sensor 14 in accordance with commands from the processor 191. The switching control circuit 195 outputs a drive signal for switching on and off the switching element 15 to the inverter circuit 13 in accordance with a command from the processor 191.

Note that in the control circuit 100, the functions are not limited to being implemented by a program. For example, the control circuit 100 may configure at least some functions with a dedicated logic circuit or an application specific integrated circuit (ASIC) integrating the logic circuit.

Control Procedure

Next, as an example of the control method, a control procedure executed by the control circuit 100 will be exemplified. The control procedure includes: generating a torque command to operate, in accordance with the operation command, the motor 7M of the electric pump 7 configured to decompress the primary-side space with respect to the secondary-side space; limiting the torque command to the limit value or less; controlling the power conversion circuit 10 to generate driving power corresponding to the torque command limited to the limit value or less and supply the driving power to the motor 7M; and temporarily increasing the limit value in response to opening of the decompressed primary-side space with respect to the secondary-side space.

Figure 4:
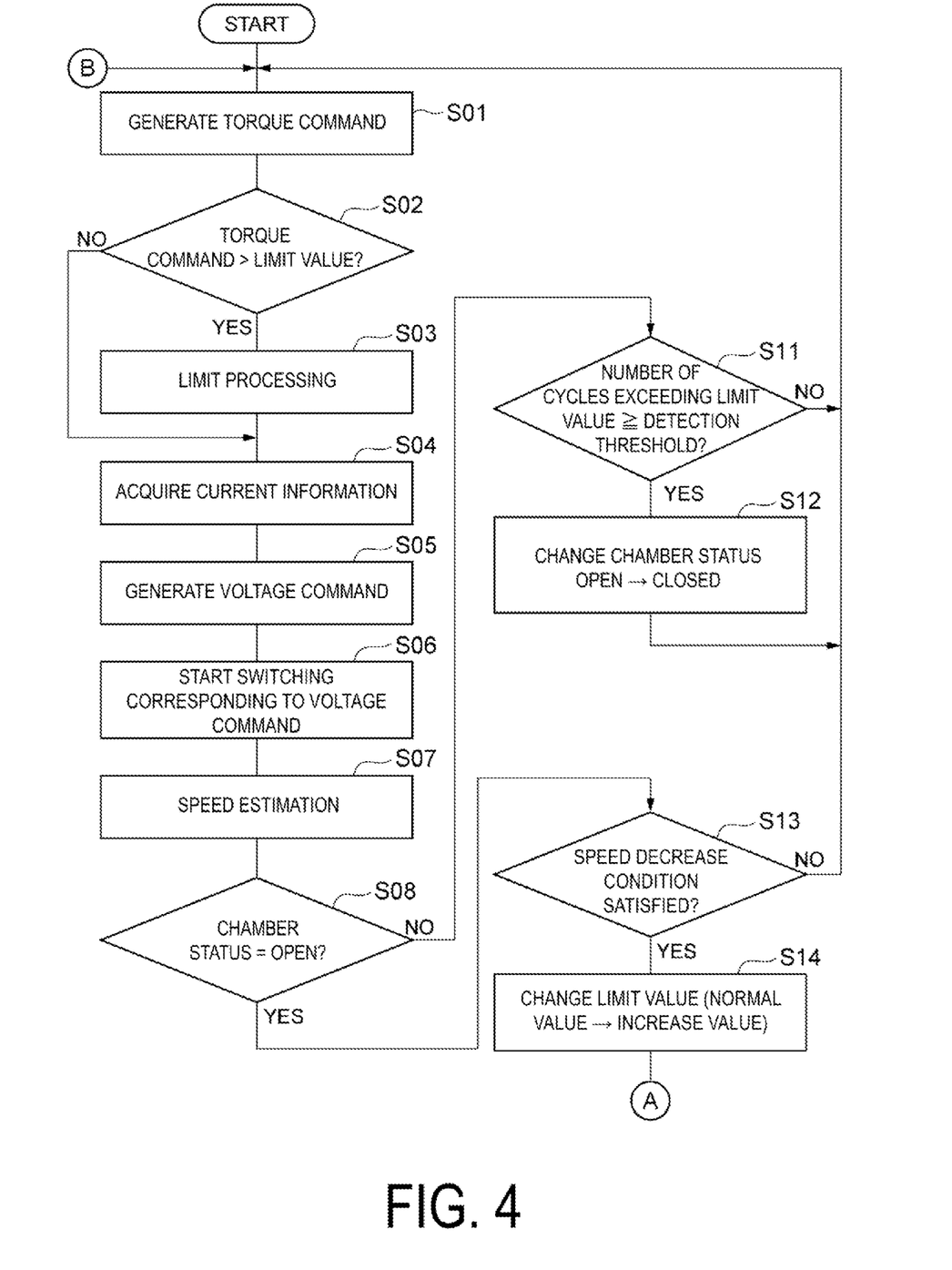
FIG. 4 is a flowchart illustrating a control procedure.

For example, as illustrated in FIG. 4, the control circuit 100 first executes steps S01 and S02. In step S01, the torque command generation unit 111 generates a torque command to operate the motor 7M in accordance with the operation command. For example, the torque command generation unit 111 generates a torque command such that the speed of the motor 7M follows the target speed. In step S02, the limiter 116 checks whether the torque command exceeds the normal limit value.

When it is determined in step S02 that the torque command exceeds the normal limit value, the control circuit 100 executes step S03. In step S03, the limiter 116 changes the torque command to the normal limit value.

Next, the control circuit 100 executes step S04. When it is determined in step S02 that the torque command does not exceed the normal limit value, the control circuit 100 executes step S03 without executing step S04. In step S04, the current information acquisition unit 112 acquires the detection value of the output current from the current sensor 14.

Next, the control circuit 100 executes steps S05, S06, S07, and S08. In step S05, the voltage command generation unit 114 generates a voltage command for causing the motor 7M to generate a torque following the torque command passed through the limiter 116. For example, the voltage command generation unit 114 calculates a current command corresponding to the torque command, and generates the voltage command such that the output current follows the current command. In step S06, the PWM control unit 115 starts turning on and off the plurality of switching elements 15 based on the voltage command generated in step S05.

In step S07, the speed estimation unit 113 estimates the speed of the motor 7M based on the voltage command and the output current. The estimation result in step S07 is used for generation of a torque command by the torque command generation unit 111 in the next control cycle. In step S08, the limit changing unit 117 checks whether it has been detected that the primary-side space is open with respect to the secondary-side space. For example, the limit changing unit 117 checks whether a chamber status indicating whether the primary-side space is open with respect to the secondary-side space is "open".

When it is determined in step S08 that the opening of the primary-side space with respect to the secondary-side space has not been detected, the control circuit 100 executes step S11. In step S11, the limit changing unit 117 checks whether the number of consecutive control cycles in which the torque command exceeds the normal limit value is equal to or greater than a predetermined detection threshold value.

When it is determined in step S11 that the number of consecutive control cycles in which the torque command exceeds the normal limit value is not equal to or greater than the detection threshold value, the control circuit 100 returns the process to step S01. Thereafter, until the number of consecutive control cycles in which the torque command exceeds the normal limit value becomes equal to or greater than the detection threshold value, the control cycle in a state where the limit value is set to the normal limit value is repeated assuming that the primary-side space is closed with respect to the secondary-side space.

When it is determined in step S11 that the number of consecutive control cycles in which the torque command exceeds the normal limit value is equal to or greater than the detection threshold value, the control circuit 100 executes step S12. In step S12, the limit changing unit 117 detects that the primary-side space is open with respect to the secondary-side space, and changes the chamber status from "closed" to "open". Then, the control circuit 100 returns the processing to step S01.

When it is determined in step S08 that the opening of the primary-side space with respect to the secondary-side space has been detected, the control circuit 100 executes step S13. In step S13, the limit changing unit 117 checks whether the speed of the motor 7M satisfies the speed decrease condition.

When it is determined in step S13 that the speed of the motor 7M does not satisfy the speed decrease condition, the control circuit 100 returns the process to step S01. Thereafter, the control cycle is repeated with the limit value maintained at the normal limit value until the speed of the motor 7M satisfies the speed decrease condition.

When it is determined in step S13 that the speed of the motor 7M satisfies the speed decrease condition, the control circuit 100 executes step S14. In step S14, the limit changing unit 117 changes the limit value from the normal limit value to the increase limit value.

Figure 5:
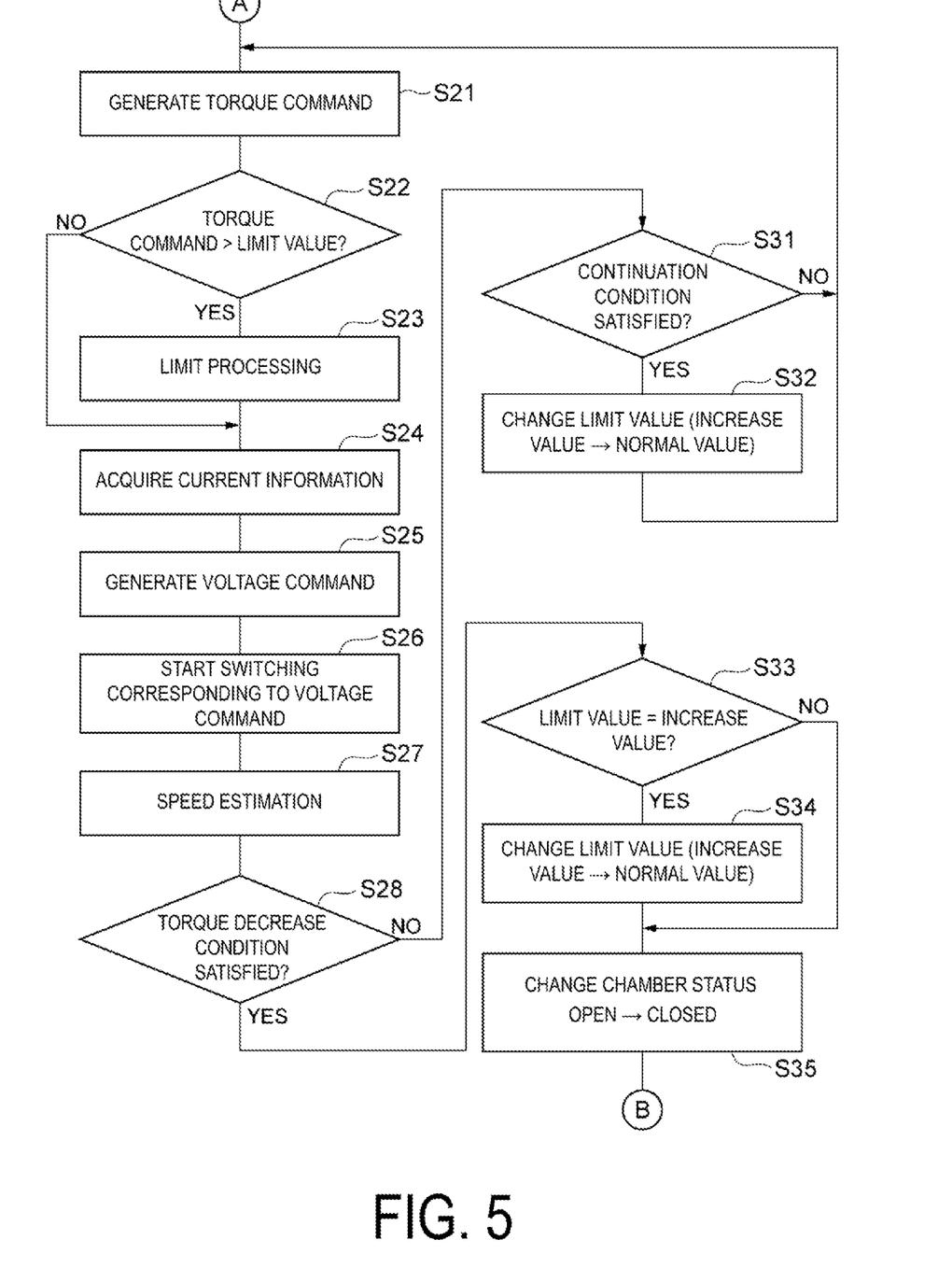
FIG. 5 is a flowchart illustrating a control procedure.

Next, as illustrated in FIG. 5, the control circuit 100 executes steps S21 and S22. In step S21, the torque command generation unit 111 generates a torque command to operate the motor 7M in accordance with the operation command. For example, the torque command generation unit 111 generates a torque command such that the speed of the motor 7M follows the target speed. In step S22, the limiter 116 checks whether the torque command exceeds the increase limit value.

When it is determined in step S22 that the torque command exceeds the increase limit value, the control circuit 100 executes step S23. In step S23, the limiter 116 changes the torque command to the increase limit value.

Next, the control circuit 100 executes step S24. When it is determined in step S22 that the torque command does not exceed the increase limit value, the control circuit 100 executes step S23 without executing step S24. In step S24, the current information acquisition unit 112 acquires the detection value of the output current from the current sensor 14.

Next, the control circuit 100 executes steps S25, S26, S27, and S28. In step S25, the voltage command generation unit 114 generates a voltage command for causing the motor 7M to generate a torque following the torque command passed through the limiter 116. For example, the voltage command generation unit 114 calculates a current command corresponding to the torque command, and generates the voltage command such that the output current follows the current command. In step S26, the PWM control unit 115 starts turning on and off the plurality of switching elements 15 based on the voltage command generated in step S25.

In step S27, the speed estimation unit 113 estimates the speed of the motor 7M based on the voltage command and the output current. The estimation result in step S27 is used for generation of a torque command by the torque command generation unit 111 in the next control cycle. In step S28, the limit changing unit 117 checks whether the torque command has decreased to satisfy the torque decrease condition.

When it is determined in step S28 that the torque command has not decreased to satisfy the torque decrease condition, the control circuit 100 executes step S31. In step S31, the limit changing unit 117 checks whether the state in which the limit value is increased continues until the continuation condition is satisfied.

In step S31, when it is determined that the state in which the limit value is increased does not continue until the continuation condition is satisfied, the control circuit 100 returns the process to step S21. Thereafter, the control cycle in the state where the limit value is set to the increase limit value is repeated until the torque command decreases to satisfy the torque decrease condition or the state where a limit value is increased continues to satisfy the continuation condition.

When it is determined in step S31 that the state in which the limit value is increased has continued until the continuation condition is satisfied, the control circuit 100 executes step S32. In step S32, the limit changing unit 117 changes the limit value from the increase limit value to the normal limit value. Then, the control circuit 100 returns the processing to step S21. Thereafter, the control cycle in a state where the limit value is set to the normal limit value is repeated assuming that the primary-side space is still open with respect to the secondary-side space.

When it is determined in step S28 that the torque command has decreased to satisfy the torque decrease condition, the control circuit 100 executes step S33. In step S33, the limit changing unit 117 checks whether the limit value is the increase limit value.

When it is determined in step S33 that the limit value is the increase limit value, the control circuit 100 executes step S34. In step S34, the limit changing unit 117 changes the limit value from the increase limit value to the normal limit value.

Next, the control circuit 100 executes step S35. When it is determined in step S33 that the limit value is not the increase limit value, the control circuit 100 executes step S34 without executing step S35. In step S35, the limit changing unit 117 detects that the primary-side space is closed with respect to the secondary-side space, and changes the chamber status from "open" to "closed". Then, the control circuit 100 returns the processing to step S01. Thereafter, the control cycle in a state where the limit value is set to the normal limit value is restarted assuming that the primary-side space is closed with respect to the secondary-side space.

Effects of the Present Embodiment

As described above, a decompression system 3 includes: an electric pump 7 configured to decompress a primary-side space with respect to a secondary-side space; and a control device 8 configured to control a motor 7M of the electric pump 7, wherein the control device 8 includes: a torque command generation unit 111 configured to generate a torque command to operate the motor 7M in accordance with an operation command; a limiter 116 configured to limit the torque command to a limit value or less; a power conversion circuit 10 configured to generate driving power corresponding to the torque command passed through the limiter 116 and supply the driving power to the motor 7M; and a limit changing unit 117 configured to temporarily increase the limit value in response to opening of the decompressed primary-side space with respect to the secondary-side space.

When the primary-side space is open with respect to the secondary-side space, a torque command for causing the motor to continue the operation corresponding to the operation command may exceed the limit value. In this case, since the torque command is limited to the limit value, the operation of the motor 7M deviates from the operation command. When the opening of the primary-side space with respect to the secondary-side space is canceled and the decompression of the primary-side space is started again, the required torque command gradually decreases, and the operation of the motor 7M gradually corresponds to the operation command.

However, when the deviation of the operation of the motor 7M from the operation command is excessive during the period in which the primary-side space is open with respect to the secondary-side space, it takes time for the operation of the motor 7M to correspond to the operation command. For this reason, the efficiency of the process performed by decompressing the primary-side space decreases. In contrast, according to the decompression system 3, the limit changing unit 117 temporarily increases the limit value in response to the opening of the primary-side space with respect to the secondary-side space, thereby suppressing the deviation of the operation of the motor 7M from the operation command. Therefore, this is effective in improving the efficiency of the process performed by decompressing the primary-side space with respect to the secondary-side space.

The operation command includes a target speed, and the torque command generation unit 111 may generate the torque command such that the speed of the motor 7M follows the target speed. In this case, the limit changing unit 117 temporarily increases the limit value, thereby more reliably suppressing the deviation of the operation of the motor 7M from the operation command.

After the primary-side space is opened with respect to the secondary-side space, the limit changing unit 117 may increase the limit value after the speed of the motor 7M decreases until a predetermined speed decrease condition is satisfied. When the limit value is increased after the torque command value is limited to the limit value, the torque command is rapidly increased. When the torque command suddenly increases in a state where the speed of the motor 7M is high, the driving power may become excessive with respect to the capability of the power conversion circuit 10.

By increasing the limit value after waiting until the speed of the motor 7M satisfies the predetermined speed decrease condition, it is possible to suppress the driving power from becoming excessive.

The limit changing unit 117 may detect the opening of the primary-side space with respect to the secondary-side space based on the torque command. In this case, the device configuration can be simplified.

The limit changing unit 117 may detect the opening of the primary-side space with respect to the secondary-side space based on a comparison between the torque command generated by the torque command generation unit 111 and the limit value before being increased. In this case, the opening of the primary-side space with respect to the secondary-side space can be detected with high sensitivity.

When the motor 7M is activated to start decompression in the primary-side space, the torque command generation unit 111 may gradually increase the speed of the motor 7M to the target speed at an accelerating rate at which the torque command is maintained to be less than the limit value. In this case, the opening of the primary-side space with respect to the secondary-side space can be prevented from being erroneously detected during the activation of the motor 7M.

A first torque is required to operate the motor 7M at a target speed in a state where a pressure difference between the secondary-side space and the primary-side space is at a first level, and a second torque larger than the first torque is required when the pressure difference between the secondary-side space and the primary-side space is at a second level smaller than the first level, and the limit changing unit 117 may change the limit value within a range from the first torque to the second torque. In this case, it is possible to suppress the occurrence of an overload on the power conversion circuit 10 in which the driving power becomes excessive with respect to the capability of the power conversion circuit 10.

The limit changing unit 117 may cancel the state in which the limit value is increased when the torque command decreases until a predetermined torque decrease condition is satisfied after the limit value is increased. In this case, it is possible to more reliably suppress the deviation of the operation of the motor 7M from the operation command by maintaining the state in which the limit value is increased until the decompression of the primary-side space with respect to the secondary-side space is started and the torque command decreases.

The torque decrease condition includes a condition that the torque command decreases to be less than the increased limit value, and the limit changing unit 117 may cancel the state in which the limit value is increased when the torque command decreases to be less than the increased limit value after the limit value is increased (increase limit value). In this case, it is possible to more reliably suppress the deviation of the operation of the motor 7M from the operation command.

The limit changing unit 117 may cancel the state in which the limit value is increased when the state in which the limit value is increased continues until a predetermined continuation condition is satisfied without the torque command decreasing until the torque decrease condition is satisfied. In this case, both efficiency improvement and overload suppression can be achieved.

The continuation condition includes a condition that the torque command is accumulated to a predetermined accumulation level, and the limit changing unit 117 may cancel the state in which the limit value is increased when the torque command is accumulated to the accumulation level without the torque command decreasing until the torque decrease condition is satisfied. In this case, it is possible to achieve both the suppression of the deviation of the operation of the motor 7M from the operation command and the suppression of the driving power from becoming excessive with respect to the capability of the power conversion circuit 10.

The continuation condition includes a condition that the state in which the limit value is increased continues for a predetermined period, and the limit changing unit 117 may cancel the state in which the limit value is increased when the state in which the limit value is increased continues for the predetermined period without the torque command decreasing until the torque decrease condition is satisfied. In this case, it is possible to achieve both the suppression of the deviation of the operation of the motor 7M from the operation command and the suppression of the driving power from becoming excessive with respect to the capability of the power conversion circuit 10.

As described above, the present disclosure is not necessarily limited to the above described embodiments, and various modifications can be made without departing from the gist of the disclosure.

REFERENCE SIGNS LIST

3 Decompression system, 7 Electric pump, 7M Motor, 8 Control device, 10 Power conversion circuit (power conversion unit), 111 Torque command generation unit, 116 Limiter, 117 Limit changing unit

The invention claimed is:

1. A decompression system comprising:
an electric pump that decompresses an internal space of a chamber with respect to an external space of the chamber;
a control circuit that:
controls a motor of the electric pump, generates a torque command to
operate the motor in accordance with an operation command,
limits the torque command to a limit value or less, and
temporarily increases the limit value in response to communication between the internal space and the external space; and
a power conversion circuit that generates driving power corresponding to the torque command passed through the control circuit and supplies the driving power to the motor.

2. The decompression system according to claim 1, wherein
the operation command includes a target speed, and
the control circuit generates the torque command such that a speed of the motor follows the target speed.

3. The decompression system according to claim 2, wherein after the communication and after the speed of the motor decreases to satisfy a predetermined speed decrease condition, the control circuit increases the limit value.

4. The decompression system according to claim 1, wherein the control circuit detects the communication based on the torque command.

5. The decompression system according to claim 4, wherein the control circuit detects the communication based on a comparison between the torque command generated by the control circuit and the limit value before being increased.

6. The decompression system according to claim 1, wherein
   a first torque is required to operate the motor at a target speed in a state where a pressure difference between the external space and the internal space is at a first level, and a second torque larger than the first torque is required when the pressure difference between the external space and the internal space is at a second level smaller than the first level, and
   the control circuit changes the limit value within a range from the first torque to the second torque.

7. The decompression system according to claim 1, wherein the control circuit cancels a state in which the limit value is increased when the torque command decreases until a predetermined torque decrease condition is satisfied after the limit value is increased.

8. The decompression system according to claim 7, wherein
   the predetermined torque decrease condition includes a condition that the torque command decreases to be less than the increased limit value, and
   the control circuit cancels the state in which the limit value is increased when the torque command decreases to be less than the increased limit value after the limit value is increased.

9. The decompression system according to claim 7, wherein the control circuit cancels the state in which the limit value is increased when the state in which the limit value is increased continues until a predetermined continuation condition is satisfied without the torque command decreasing until the predetermined torque decrease condition is satisfied.

10. The decompression system according to claim 9, wherein
    the predetermined continuation condition includes a condition that the state in which the limit value is increased continues for a predetermined period, and
    the control circuit cancels the state in which the limit value is increased when the state in which the limit value is increased continues for the predetermined period without the torque command decreasing until the predetermined torque decrease condition is satisfied.

11. A control device comprising:
    a control circuit that:
       generates a torque command to operate, in accordance with an operation command, a motor of an electric pump that decompresses an internal space of a chamber with respect to an external space of the chamber,
       limits the torque command to a limit value or less, and
       temporarily increases the limit value in response to communication between the internal space and the external space; and
    a power conversion circuit that generates driving power corresponding to the torque command passed through the control circuit and supplies the driving power to the motor.

12. A control method comprising:
    generating a torque command to operate, in accordance with an operation command, a motor of an electric pump that decompresses an internal space of a chamber with respect to an external space of the chamber;
    limiting the torque command to a limit value or less;
    generating driving power corresponding to the torque command limited to the limit value or less and supplying the driving power to the motor; and
    temporarily increasing the limit value in response to communication between the internal space and the external space.

* * * * *